United States Patent
Tsuge et al.

(10) Patent No.: US 9,410,620 B2
(45) Date of Patent: Aug. 9, 2016

(54) VEHICLE TRANSMISSION CONTROL DEVICE

(71) Applicants: Shogo Tsuge, Susono (JP); Seiji Masunaga, Susono (JP); Yoshio Hasegawa, Chiryu (JP); Keisuke Ota, Susono (JP)

(72) Inventors: Shogo Tsuge, Susono (JP); Seiji Masunaga, Susono (JP); Yoshio Hasegawa, Chiryu (JP); Keisuke Ota, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/439,177

(22) PCT Filed: Nov. 16, 2012

(86) PCT No.: PCT/JP2012/079863
§ 371 (c)(1),
(2) Date: Apr. 28, 2015

(87) PCT Pub. No.: WO2014/076822
PCT Pub. Date: May 22, 2014

(65) Prior Publication Data
US 2015/0276051 A1 Oct. 1, 2015

(51) Int. Cl.
*F16H 61/04* (2006.01)
*F16H 61/10* (2006.01)
*F16H 61/00* (2006.01)

(52) U.S. Cl.
CPC .... *F16H 61/0437* (2013.01); *F16H 2061/0093* (2013.01); *F16H 2061/0477* (2013.01)

(58) Field of Classification Search
CPC .................................. F16H 61/04; F16H 61/10
See application file for complete search history.

(56) References Cited

U.S. PATENT DOCUMENTS

| 7,695,405 | B2 * | 4/2010 | Satou | B60W 30/19 477/107 |
|---|---|---|---|---|
| 8,219,293 | B2 * | 7/2012 | Sato | F16H 61/061 477/34 |
| 2015/0184740 | A1 * | 7/2015 | Masunaga | F16H 61/04 701/51 |

FOREIGN PATENT DOCUMENTS

| JP | 2000097325 A | 4/2000 |
|---|---|---|
| WO | 2014020685 A1 | 2/2014 |

* cited by examiner

*Primary Examiner* — Tisha Lewis
(74) *Attorney, Agent, or Firm* — Oliff PLC

(57) ABSTRACT

An automatic transmission shifting control including: a shifting target value calculating portion setting shifting target values, torque of a rotary-member on the output shaft side, and rate of change of rotating speed of a rotary-member on the input shaft side; a manipulated calculating portion setting manipulated amounts, a torque of the rotary-member on the input shaft side, a torque capacity of one coupling device engaging for a transmission shifting-action, and torque capacity of other coupling devices releasing the shifting-action; a torque assignment ratio calculating portion setting torque assignment ratios to transfer through the respective coupling devices to engage and release the shifting-action; when a second-shifting-action is required during a preceding first-shifting-action according to a first-shifting-model, the manipulated calculating portion switching the first-shifting-model corresponding to the first-shifting-action to a second-shifting-model corresponding to the second-shifting-action, implementing a transmission shifting control for the second-shifting-action according to the second-shifting-model.

5 Claims, 9 Drawing Sheets

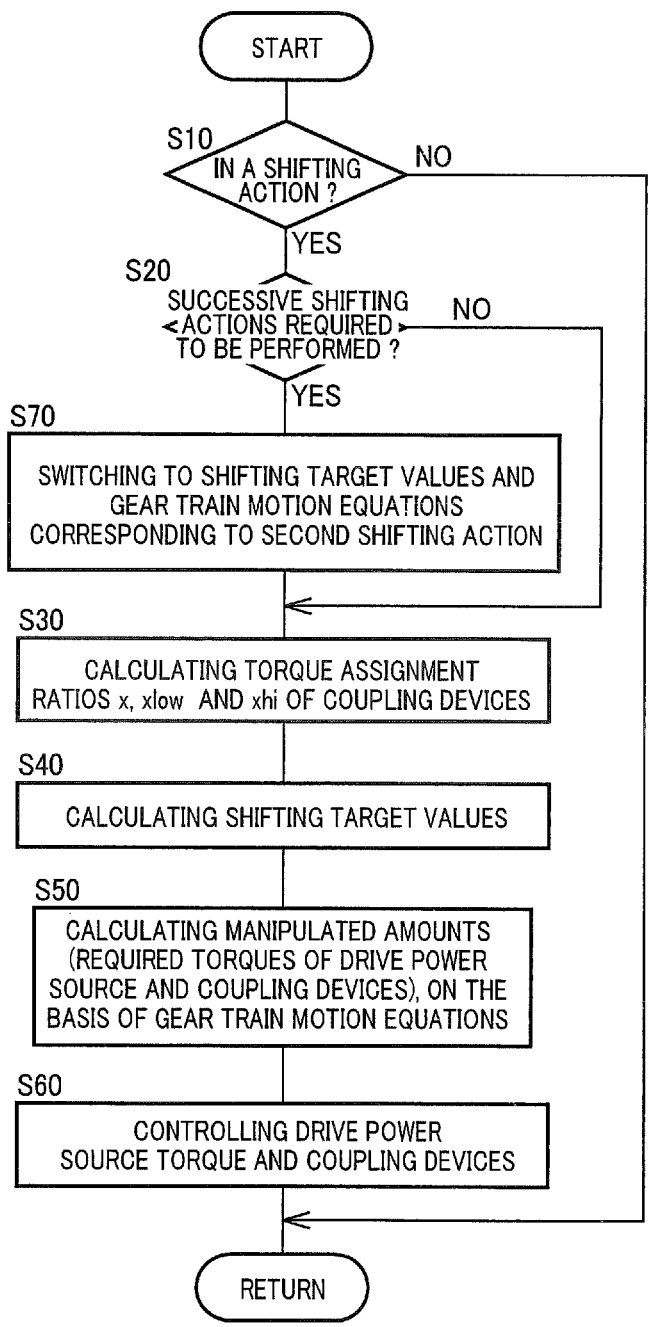

VEHICLE TRANSMISSION CONTROL DEVICE

TECHNICAL FIELD

The present invention relates to a vehicle transmission shifting control apparatus configured to implement a shifting control of an automatic transmission, and more particularly to techniques for implementing the shifting control of the automatic transmission according to a shifting model.

BACKGROUND ART

There is well known an automatic transmission which comprises a plurality of coupling devices for transmitting a rotary motion and a torque between an input shaft provided to receive a drive force from a drive power source and an output shaft provided to transmit the drive force to drive wheels. The automatic transmission is configured to be shifted with concurrently performed engaging and releasing actions of the respective two coupling devices. Generally, the automatic transmission of this type is shifted according to manipulated amounts, i.e., control inputs determined by a control map obtained for each shift position by simulation on an actual vehicle wherein required values (namely, the manipulated amounts, i.e., control inputs) of control parameters (such as torque values) of devices to be controlled for shifting actions are optimized for each shift position. However, a recent demand for an increase of the required number of shift positions of an automatic transmission causes a need for a considerably large amount of efforts for optimization of the manipulated amounts, making it difficult to adopt a shifting control mode based on the control map. In view of this difficulty, there has been proposed a shifting model control which is a shifting control mode based on motion equations for each of rotary elements incorporated in the automatic transmission. In this shifting model control, the automatic transmission is shifted according to manipulated amounts uniquely determined by solving the motion equations obtained on the basis of a required manner of change (shifting target values) for each shifting action. For instance, Patent Document 1 discloses a technique for implementing a shifting control of the automatic transmission wherein a target value of a rotating speed of an input shaft of the automatic transmission is determined as one of the shifting target values during an inertia phase control, while a required value of a torque of a clutch to be engaged is calculated as one of the manipulated amounts according to a shifting model. The Patent Document 1 further discloses a technique for implementing a shifting control of the automatic transmission wherein target values of the rotating speed of the input shaft and a torque of an output shaft of the automatic transmission are determined as the shifting target values, while a required value of a torque of a clutch to be engaged and a required value of a torque of a clutch to be released are calculated as the manipulated amounts according to a shifting model.

PRIOR ART DOCUMENT

Patent Document

Patent Document 1: JP-2000-097325-A

SUMMARY OF THE INVENTION

Object Achieved by the Invention

By the way, according to the techniques disclosed in the above-identified Patent Document 1, the shifting control is implemented by controlling one control device for one shifting target value, or two control devices for two shifting target values. However, these techniques disclosed in the Patent Document 1 may suffer from deterioration of drivability of the vehicle due to a relatively long time required for completion of a shifting action of the automatic transmission, because a hydraulic pressure of a coupling device to be released for the shifting action is first lowered for a releasing action of the coupling device, and is then temporarily raised for an engaging action of the coupling device, in order to offset an inertia torque in the inertia phase (in other words, in order to prevent a substantial change of the torque of the output shaft in the inertia phase). On the other hand, there is well known a technique so-called "engine torque reduction control" wherein a torque of an engine is temporarily reduced in the inertia phase in order to offset the inertia torque. According to the techniques disclosed in the above-identified Patent Document 1, however, the motion equations do not consider the engine as a controlled object. That is, according to the techniques disclosed in the Patent Document 1, the motion equations are solved with respect to a certain value of the engine torque, so that the shifting model control disclosed in the Patent Document 1 does not permit offsetting of the inertia torque by the engine torque reduction control implemented in place of the temporary rise of the hydraulic pressure of the coupling device to be released for the shifting action. Although the engine torque reduction control may be implemented in addition to the shifting model control, the engine torque reduction control disturbs the shifting model control as a whole, leading to a need for solving again the motion equations, and a consequent requirement for a considerably long time for completion of the shifting action, and a risk of deterioration of the vehicle drivability due to an increase of the shifting shock. If the engine torque is also uniquely determined as a manipulated amount according to the shifting model control, on the other hand, three manipulated amounts are used for two shifting target values, so that the motion equations cannot be solved, resulting in a failure of the shifting action of the automatic transmission according to the shifting model control.

It is noted that the problems indicated above are not publicly known, and that there have been no proposals to suitably set a restricting condition for solving the motion equations according to one shifting model for each of different shifting actions including a power-on shift-up action, a power-off shift-up action, a power-on shift-down action and a power-off shift-down action, where the three manipulated amounts are used for the two shifting target values. The present invention proposes a new technique for suitably setting the restricting condition for solving the motion equations (Refer to International Application No. PCT/JP2012/069408 which has not been laid open at the time of filing of the present patent application). In addition, the present invention proposes a technique for improving the above-indicated new technique.

The present invention was made in view of the background art described above. It is therefore an object of the present invention to provide a vehicle transmission shifting control apparatus which permits a desired shifting control of an automatic transmission according to a shifting model, even where three manipulated amounts are used for two shifting target values.

Means for Achieving the Object

The object indicated above is achieved according to a first aspect of the present invention, which provides a transmission shifting control apparatus for a vehicle including (a) an automatic transmission which comprises a plurality of coupling devices for transmitting a rotary motion and a torque between an input shaft provided to receive a drive force from a drive power source and an output shaft provided to transmit the drive force to drive wheels, and which is configured to be shifted with concurrently performed engaging and releasing actions of the respective coupling devices, the above-described control apparatus being configured to implement a shifting control of the above-described automatic transmission according to a predetermined shifting model for determining manipulated amounts to establish shifting target values, the control apparatus being characterized by: (b) a shifting target value calculating portion configured to set, as the above-described shifting target values, a torque of a rotary member disposed on the side of the above-described output shaft, and a rate of change of a rotating speed of a rotary member disposed on the side of the above-described input shaft; (c) a manipulated amount calculating portion configured to set, as the above-described manipulated amounts, a torque of the rotary member disposed on the side of the above-described input shaft, a torque capacity of one of the coupling devices which is to be engaged for a shifting action of the above-described automatic transmission, and a torque capacity of the other of the coupling devices which is to be released for the shifting action; and (d) a torque assignment ratio calculating portion configured to set torque assignment ratios which are ratios of torques to be transferred through the respective coupling devices to be engaged and released for the shifting action; and wherein (e) when a second shifting action of the automatic transmission is required to be performed, during a first shifting action according to a preceding first shifting model, the above-described manipulated amount calculating portion switches the above-described first shifting model to a second shifting model corresponding to the above-described second shifting action, to implement a shifting control of the automatic transmission for performing the second shifting action according to the above-described second shifting model. The above-described torque assignment ratios are the ratios of the torques assigned to be transferred through the above-indicated coupling devices to be respectively engaged and released for the shifting action, when the assigned torques are represented by the torque of the rotary member on the side of the above-described input shaft.

Advantages of the Invention

According to the first aspect of the invention described above, the torque assignment ratios which are the ratios of the torques of the coupling devices to be respectively engaged and released are used as a restricting condition which should be satisfied to permit determination of the three manipulated amounts for establishing the two shifting target values. Accordingly, it is possible to adequately control a torque transfer between the coupling devices to be engaged and released (namely, a progress of the shifting action) during shifting, which would otherwise be considered difficult, and possible to determine the three manipulated amounts. Described in a different way, where one of the three manipulated amounts is set to be a predetermined certain value to determine the three manipulated amounts, this predetermined value should be selected from a large number of values corresponding to respective different shifting actions, for instance. According to the present invention, the torque assignment ratios representative of the torque transfer are set as the restricting condition, so that a predetermined shifting model can deal with all of the different shifting actions. Described more specifically, if one of the torque capacity of the coupling device to be engaged and the torque capacity of the coupling device to be released is used as the restricting condition, there is a risk of occurrence of a tie-up phenomenon or a racing phenomenon of a rotary member. In the present invention, however, the torque assignment ratios suitable for controlling the progress of the shifting action are used as the restricting condition, so that it is possible to reduce a risk of occurrence of the tie-up or racing phenomenon, or to improve ease of control to be implemented for positively causing the tie-up or racing phenomenon to the contrary. If the torque of the rotary member disposed on the side of the input shaft is used as the restricting condition, there is a risk of failure to implement a control for temporarily changing an output torque of a drive power source. In the present invention, it is possible to adequately implement a torque reduction control for temporarily reducing the output torque of the drive power source in an inertia phase of the shifting action. Thus, the present invention permits adequate determination of the three manipulated amounts according to the shifting model, and a desired shifting control of the automatic transmission so as to establish the two shifting target values, although the three manipulated amounts are used for the two shifting target values.

By the way, the automatic transmission may be required to perform successive shifting actions, namely, required to perform a second shifting action, during a first shifting action. If the automatic transmission was simply controlled so as to perform the successive shifting actions according to a shifting model, the second shifting action would be performed only after the first shifting action is completed, so that a comparatively long length of time would be required to complete the successive shifting actions, that is, to shift the automatic transmission to a finally selected shift or gear position. To overcome this problem, the control apparatus according to the first aspect of this invention is configured such that when the second shifting action of the automatic transmission is required to be performed, during the first shifting action according to the first shifting model, the manipulated amount calculating portion switches the first shifting model to the second shifting model corresponding to the second shifting action, to implement a shifting control of the automatic transmission for performing the second shifting action according to the second shifting model, so that the automatic transmission can be shifted to the desired final shift position in a shorter length of time than in the case where the second shifting action to the final shift position is performed only after the first shifting action is completed. Accordingly, a response of the automatic transmission to a required vehicle drive force is improved. Thus, the transmission shifting control apparatus according to the present invention permits a more adequate shifting control of the automatic transmission according to a shifting model.

According to a second aspect of the invention, the transmission shifting control apparatus according to the first aspect of the invention is configured such that the above-described manipulated amount calculating portion does not switch the above-described first shifting model to the above-described second shifting model, where the second shifting action is required during the first shifting action while the above-described torque assignment ratios are being changed. This second aspect of the invention is based on a fact that when the automatic transmission is required to perform the second shifting action while the torque assignment ratios are being changed during the first shifting action according to the first shifting model, the manipulated amount calculating portion should set a total of four manipulated amounts, that is, the torque of the coupling device to be engaged for the second shifting action, in addition to the torque of the coupling device to be engaged for the first shifting action, the torque of the coupling device to be released for the first shifting action. Namely, there are four manipulated amounts for the two shifting target values, so that the shifting model cannot be solved. In view of this fact, the manipulated amount calculating portion according to the second aspect of the invention is configured to permit switching of the first shifting model to the second shifting model only where the torque assignment ratios are not being changed during the first shifting action, so that the manipulated amount calculating portion can set the three manipulated amounts for the two shifting target values, whereby the automatic transmission can be more adequately shifted to the desired final shift position according to the second shifting model. Stated in a different way, the manipulated amount calculating portion inhibits the second shifting action while the torque assignment ratios are being changed, so that it is possible to prevent a failure to solve the shifting model.

According to a third aspect of the invention, the transmission shifting control apparatus according to the second aspect of the invention is configured such that when the above-described second shifting action is required to be performed, during the above-described first shifting action while the above-described torque assignment ratios are being changed, the above-described manipulated amount calculating portion switches the above-described first shifting model to the above-described second shifting model after changes of the torque assignment ratios are terminated. According to this third aspect of the invention, the automatic transmission can be shifted to the desired final shift position in a shorter length of time than where the second shifting action is initiated only after the first shifting action is completed, although the length of time required to shift the automatic transmission to the final shift position is increased due to initiation of the second shifting action after termination of the changes of the torque assignment ratios.

According to a fourth aspect of the invention, the transmission shifting control apparatus according to the second or third aspect of the invention is configured such that the above-described torque assignment ratios are returned back to original values prior to a moment of initiation of their changes for the above-described first shifting action during which the above-described second shifting action is required to be performed, the above-described first shifting model corresponding to the first shifting action is switched to the above-described second shifting model corresponding to the second shifting action after the torque assignment ratios have been returned to the original values. According to this fourth aspect of the invention, the automatic transmission can be shifted to the desired final shift position within a further shorter length of time, where a length of time required for returning the torque assignment ratios back to the original values prior to the moment of initiation of their changes is shorter than a length of time required for completion of the changes to predetermined final values. Accordingly, the response of the automatic transmission to the required vehicle drive force is further improved.

According to a fifth aspect of the invention, the transmission shifting control apparatus according to any one of the first through fourth aspects of the invention is configured such that the above-described manipulated amount calculating portion is operated according to the above-described shifting model which is formulated to calculate the above-described manipulated amounts on the basis of the above-described shifting target values, and according to motion equations of the automatic transmission, and a relationship representative of the above-described torque assignment ratios. The motion equations include the above-described shifting target values and the above-described manipulated amounts. According to this fifth aspect of the invention, the three manipulated amounts can be adequately determined according to the above-indicated motion equations formulated to implement the control of the torque transfer between the coupling devices to be released and to be engaged during the shifting action, which would otherwise be considered difficult.

BRIEF DESCRIPTION OF THE DRAWINGS

FIG. 4 is a flow chart for explaining a major control operation of the electronic control device, namely, a control operation to permit an adequate shifting control of desired shifting in the automatic transmission according to a shifting model even where the automatic transmission is required to perform successive shifting actions;

MODE FOR CARRYING OUT THE INVENTION

Figure 1:
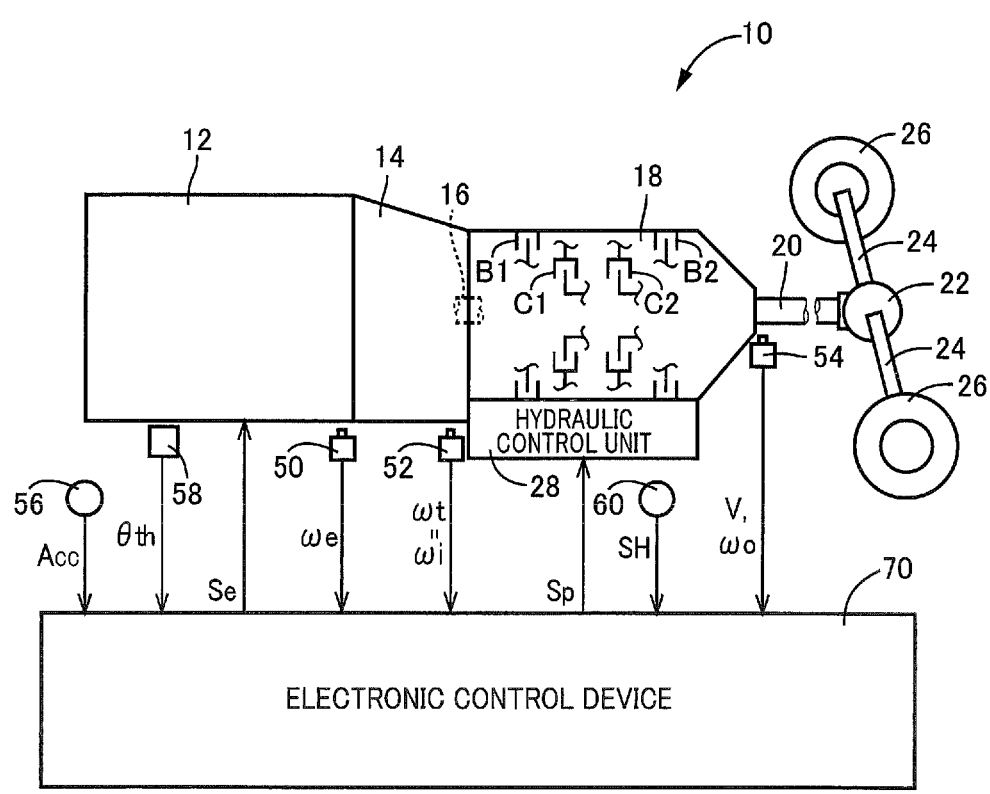
FIG. 1 is a schematic view for explaining an arrangement of a power transmitting path of a vehicle to which the present invention is applicable, and a major portion of a control system provided for the vehicle.

According to the present invention, the above-described vehicle is preferably arranged to transmit the drive force of the above-described drive power source to the above-described drive wheels through a power transmitting device such as the above-described automatic transmission. The automatic transmission is a step-variable automatic transmission having a plurality of shift positions (gear positions) having respective different speed ratios (gear ratios), each of which is selectively established with concurrently performed engaging and releasing actions of selected respective two coupling devices. For example, the step-variable automatic transmission is a known planetary gear type automatic transmission. The coupling devices widely used in this planetary gear type automatic transmission include clutches and brakes of multiple-disk or single-disk type which are brought into their engaged states by hydraulic actuators, or other types of coupling devices such as band brakes. The above-described vehicle is provided with a hydraulic control unit configured to apply hydraulic pressures to the hydraulic actuators of the coupling devices, for instance. This hydraulic control unit incorporates linear solenoid valves, ON-OFF solenoid valves, etc., and applies output hydraulic pressures of those solenoid valves to the hydraulic actuators, either directly or indirectly via shift control valves, for example. The expression "apply hydraulic pressures to xxx" is interpreted to mean "cause the hydraulic pressures to act on xxx" or "supply a working oil pressurized to certain hydraulic pressures, to xxx".

The above-described drive power source is preferably an engine such as a gasoline engine or a diesel engine. Alternatively, the drive power source is a prime mover including an electric motor or motors, or a combination of the prime mover and the engine.

Referring to the drawings, preferred embodiments of the present invention will be described in detail.

First Embodiment

FIG. 1 is the schematic view for explaining an arrangement of a power transmitting path from an engine 12 to drive wheels 26 of a vehicle 10 to which the present invention is applicable, and a major portion of a control system provided for the vehicle 10. As shown in FIG. 1, a drive force generated by the engine 12 serving as a drive power source is input to an automatic transmission 18 through a torque converter 14 and an input shaft 16, and is transmitted from an output shaft 20 of the automatic transmission 18 to the right and left drive wheels 26 through a differential gear device (differential gear) 22 and a pair of axles (drive shafts) 24 in this order of description.

The automatic transmission 18 is a known planetary gear type automatic transmission including one planetary gear set or a plurality of planetary gear sets, and a plurality of coupling devices (coupling elements), which are housed in a stationary member in the form of a transmission casing attached to a body of the vehicle. The automatic transmission 18 has a plurality of shift positions or gear positions which are selectively established by the coupling devices. For instance, the automatic transmission 18 is a step-variable transmission which is shifted with so-called "clutch-to-clutch shifting actions", that is, with switching actions of selected two coupling devices (namely, with concurrently performed engaging and releasing actions of respective two coupling devices). Each of the plurality of coupling devices is a hydraulically operated frictional coupling device configured to transmit a rotary motion and a torque between the input shaft 16 provided to receive the drive force from the engine 12 and the output shaft 20 provided to transmit the drive force to the drive wheels 26. This input shaft 16, which is an input shaft of the automatic transmission 18, also serves as a turbine shaft to be rotated by a turbine impeller of the torque converter 14.

Each of the hydraulically operated frictional coupling devices is a clutch or a brake which is controlled by a hydraulic control unit 28, so as to be selectively placed in its engaged state or released state. A torque capacity, namely, an engaging force of the clutch or brake is controlled by hydraulic pressure regulation by solenoid valves incorporated within the hydraulic control unit 28, so that two rotary members between which the clutch or brake is disposed are selectively coupled to each other. In this respect, it is noted that the torque capacity of the coupling device (hereinafter referred to as "clutch torque") is determined by a friction coefficient of friction members of the coupling device, and an engaging hydraulic pressure applied to the friction members to force the friction members against each other. To permit transmission of a torque (for instance, a transmission input torque Ti or turbine torque Tt received by the input shaft 16) between the input shaft 16 and the output shaft 20, without a slipping action of the coupling device (that is, without a speed difference between the two rotary members of the coupling device), the torque capacity of the coupling device is required to be larger than a transmission torque assigned to the coupling device to transmit the above-indicated torque (namely, larger than an assignment torque of the coupling device). It is noted that the transmission torque will not be increased by increasing the torque capacity after the torque capacity reaches the transmission torque. It is noted that for convenience's sake, the clutch torque and the engaging hydraulic pressure may be regarded to be equivalent in meaning to each other in the present embodiment.

For example, the gear positions (shift positions) of the automatic transmission 18 include a low-speed gear position (low-gear position: first-speed gear position, for instance) to be established when a clutch C1 and a brake B1 are placed in their engaged states, and a high-speed gear position (high-gear position; second-speed gear position, for instance) to be established when the clutch C1 and a brake B2 are placed in their engaged states. Accordingly, the automatic transmission 18 is shifted between the low-gear position and the high-gear position, with switching actions of the brakes B1 and B2. In the following description of the present embodiment, the coupling device (brake B1, for example) placed in the engaged state to establish the low-gear position out of the two coupling devices switched during the shifting will be referred to as "low-gear position coupling device", while the coupling device (brake B2, for example) placed in the engaged state to establish the high-gear position will be referred to as "high-gear position coupling device". The low-gear position coupling device is brought into its released state when the automatic transmission 18 is shifted up from the low-gear position to the high-gear position, and is brought into its engaged state when the automatic transmission 18 is shifted down from the high-gear position to the low-gear position. On the other hand, the high-gear position coupling device is brought into its engaged state when the automatic transmission 18 is shifted up from the low-gear position to the high-gear position, and is brought into its released state when the automatic transmission 18 is shifted down from the high-gear position to the low-gear position. The shift positions of the automatic transmission 18 further include a higher-speed gear position (a third-speed position, for example) than the above-indicated second-speed gear position), which higher-speed gear position is established when the clutch C1 and a clutch C2 are placed in their engaged states. The second-speed gear position is the low-gear position while the third-speed gear position is the high-gear position.

Referring back to FIG. 1, the vehicle 10 is provided with an electronic control device 70 including a transmission shifting control apparatus configured to implement a shifting control of the automatic transmission 18, for instance. The electronic control device 70 incorporates a so-called microcomputer which comprises a CPU, a RAM, a ROM and an input-output interface. The CPU is operable to perform signal processing operations according to programs stored in the ROM while utilizing a temporary data storage function of the RAM, to implement various controls of the vehicle 10. For example the electronic control device 70 implements an output control of the engine 12 and a shifting control of the automatic transmission 18. The electronic control device 70 may be constituted by mutually independent control units as needed for respective controls such as an engine control and a hydraulic control (shifting control). Further, the electronic control device 70 is configured to receive various signals such as: an output signal of an engine speed sensor 50 indicative of an engine speed $\omega e$ which is an operating speed of the engine 12; an output signal of a turbine speed sensor 52 indicative of a turbine speed $\omega t$, namely, a transmission input speed $\omega i$, which is a rotating speed of the input shaft 16; an output signal of a transmission output speed sensor 54 indicative of a transmission output speed $\omega o$ which is a rotating speed of the output shaft 20 corresponding to a vehicle running speed V; an output signal of an accelerator operation amount sensor 56 indicative of an operation amount Acc of an accelerator pedal, which represents a drive force (drive torque) of the vehicle 10 corresponding to a vehicle output required by the vehicle operator; an output signal of a throttle valve opening angle sensor 58 indicative of an opening angle $\theta$th of a throttle valve; and an output signal of a shift position sensor 60 indicative of a shift position SH selected by a shift lever or a paddle switch). The electronic control device 70 is also configured to generate various signals such as engine output control command signals Se for controlling the output of the engine 12, and hydraulic command signals Sp controlling the hydraulic control unit 28 for actuating the hydraulic actuators of the automatic transmission 18.

Figure 2:
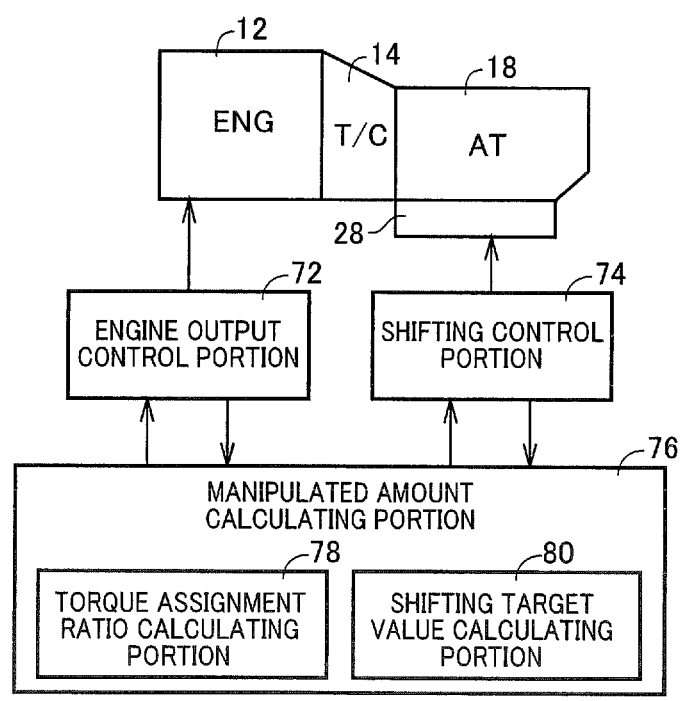
FIG. 2 is a functional block diagram for explaining major control functions of an electronic control device.

FIG. 2 is the functional block diagram for explaining major control functions of the electronic control device 70. Engine output control means in the form of an engine output control portion 72 shown in FIG. 2 is configured to generate the engine output control command signals Se for implementing a throttle control by operating a throttle actuator to control the electronic throttle valve so as to generate a required engine torque Te (hereinafter referred to as "required engine torque Tedem), a fuel injection amount control by operating a fuel injecting device to control an amount of injection of a fuel, and an ignition timing control by operating an igniter or an ignition device. The engine output control portion 72 calculates a required drive force Fdem on the basis of actual values of the accelerator pedal operation amount Acc and the vehicle running speed V, and according to a stored relationship (drive force map) not shown, between the vehicle running speed V and the required drive force Fdem, with the accelerator pedal operation amount Acc used as a parameter, for instance. The engine output control portion 72 calculates the required engine torque Tedem for obtaining the calculated required drive force Fdem, on the basis of an effective radius of tires of the drive wheels 26, the gear ratio of the presently established gear position of the automatic transmission 18, a final speed reduction ratio in a power transmitting path between the output shaft 20 and the drive wheels 26, and a torque ratio t of the torque converter 14. It is noted that the torque ratio t of the torque converter 14 is calculated on the basis of an actual value of a speed ratio e (=turbine speed $\omega t$/pump speed $\omega p$ (engine speed $\omega e$) and according to a stored known relationship (operational characteristic map of the torque converter 14) among the speed ratio e, the torque ratio t, an operating efficiency and capacity coefficient of the torque converter 14.

Shifting control means in the form of a shifting control portion 74 is configured to implement the shifting control of the automatic transmission 18. Described more specifically, the shifting control portion 74 determines whether a shifting action of the automatic transmission 18 should be performed. This determination is made on the basis of a running state of the vehicle represented by the actual values of the vehicle running speed V and the accelerator pedal operation amount Acc, and according to a stored known relationship (shifting map or shifting line diagram) using the vehicle running speed V and the accelerator pedal operation amount Acc as variables. When the shifting control portion 74 determines that a shifting action of the automatic transmission 18 should be performed, the shifting control portion 74 implements an automatic shifting control so as to establish the newly selected gear position. For example, the shifting control portion 74 applies to the hydraulic control unit 28 the hydraulic command signals Sp for engaging and releasing the relevant coupling devices to shift the automatic transmission 18 to the newly selected gear position. For example, the hydraulic command signals Sp represent the commanded hydraulic pressure value for establishing the torque capacity of the low-gear position coupling device (hereinafter referred to as "low-gear position clutch torque"), and the commanded hydraulic pressure value for establishing the torque capacity of the high-gear position coupling device (hereinafter referred to as "high-gear position clutch torque").

The shifting control to shift the automatic transmission 18 may be formulated to determine the torque capacities (commanded hydraulic pressure values) during a shifting action according to a predetermined control map which is obtained by simulation on an actual vehicle wherein the shifting action of the automatic transmission 18 is performed so as to optimize the shifting shock and the required shifting time. This manner of shifting control requires different control maps which correspond to different kinds of shifting action such as a power-on shift-up action, a power-off shift-up action, a power-on shift-down action, and a power-off shift-down action, and which correspond to respective combinations of the two gear positions between which the shifting action is performed, for example, between the first-speed and second-speed gear positions, or between the second-speed and third-speed gear positions. Described more specifically, the different control maps include control maps corresponding to a power-on shift-down action from the third-speed gear position to the second-speed gear position, and a power-off shift-down action from the second-speed gear position to the first-speed gear position, for instance. Therefore, a large amount of efforts is required for the above-indicated optimization, where the number of the gear positions of the automatic transmission 18 available is relatively large.

In view of the finding described above, the shifting control according to the present embodiment employs a shifting model in place of the above-indicated control maps, to determine manipulated amounts for establishing shifting target values to shift up or down the automatic transmission 18. The above-indicated shifting target values are target values of control parameters (such as a shifting time and a drive force) determining a required manner of change during the relevant shifting action, while the above-indicated manipulated amounts are required values of control parameters (such as the engine torque and the clutch torques) of the devices to be controlled.

The shifting control of the automatic transmission 18 according to the shifting model will be described in detail. Equations (1) and (2) given below are motion equations applicable to a shifting action of the automatic transmission 18. These equations (1) and (2) are derived from motion equations for each of rotary elements of the automatic transmission 18 connected to each other, and relationship equations for the planetary gear set of the automatic transmission 18. The above-indicated motion equations for each rotary element are formulated such that a torque represented by a product of an inertia of each rotary element and a rate of change of a rotating speed of the rotary element is defined by torques of the three members (sun gear, carrier and ring gear)

of the planetary gear set and one of two members disposed on the respective opposite sides of the coupling device, which one member is associated with each rotary element. The relationship equations for the planetary gear set, which use the gear ratio of the planetary gear set (=number of teeth of the sun gear/number of teeth of the ring gear), respectively represent a relationship of the torques of the three members of the planetary gear set and a relationship of the rates of change of the rotating speeds of the three members. In the equations (1) and (2), dωt/dt represents a time derivative of the turbine speed ωt (namely, transmission input speed ωi), that is, a rate of change of the turbine speed ωt, and therefore represents an angular acceleration of the input shaft 16 (hereinafter referred to as "input shaft angular acceleration), which is a rate of change of the rotating speed of the rotary member disposed on the side of the input shaft 16. (In the drawings and the equations, the rate of change is represented by a dot.) dωo/dt represents a rate of change of the transmission output speed ωo and an output shaft angular acceleration. Tt represents a torque of the input shaft 16, namely, a turbine torque, that is, the transmission input torque Ti, which is a torque of the rotary member disposed on the side of the input shaft 16. This turbine torque Tt is equivalent to the engine torque Te (=Tt/t) with a torque ratio t of the torque converter 14 taken into account. To represents a torque of the output shaft 20, namely, the transmission output torque, which is a torque of the rotary member disposed on the side of the output shaft 20. Tclow represents the low-gear position clutch torque, which is the torque of the clutch to be released during a shift-up action, and the torque of the clutch to be engaged during a shift-down action. Tchi represents the high-gear position clutch torque, which is the torque of the clutch to be engaged during the shift-up action, and the torque of the clutch to be released during the shift-down action. a1, a2, b1, b2, c1, c2, d1 and d2 are constants used in the equations (1) and (2), which are coefficients determined on the basis of the inertia of each of the above-indicated rotary elements and the gear ratio of the above-described planetary gear set (these coefficients differ depending upon the specific shifting actions). Therefore, one set of motion equations is defined, however, constants in the motion equations differ for each shifting, and thus, different motion equations are provided for each shifting of the automatic transmission.

[First Set of Equations]

$$\dot{\omega}t = a1 \cdot Tt + b1 \cdot Tclow + c1 \cdot Tchi + d1 \cdot \dot{\omega}o \quad (1)$$

$$\dot{To} = a2 \cdot Tt + b2 \cdot Tclow + c2 \cdot Tchi + d2 \cdot \dot{\omega}o \quad (2)$$

The above-indicated equations (1) and (2) are gear train motion equations of the automatic transmission 18 obtained by formulating a relationship between the shifting target values and the manipulated amounts. The shifting target values are target values of the shifting time and the drive force, and can be dealt with by the gear train motion equations. In the present embodiment, the shifting time is represented by the input shaft angular acceleration dωt/dt, as an example. Further, the drive force is represented by the transmission output torque To, as an example. That is, the input shaft angular acceleration dωt/dt and the transmission output torque To are used as the two shifting target values, in the present embodiment. On the other hand, the turbine torque Tt (equivalent to the engine torque Te), the low-gear position clutch torque Tclow and the high-gear position clutch torque Tchi are used as the three manipulated amounts to establish the shifting target values, in the present embodiment. Therefore, the three manipulated amounts to establish the two shifting target values represented by the two motion equations in the form of the above-indicated equations (1) and (2) cannot be obtained uniquely by solving the two equations. Thus, the automatic transmission 18 cannot be adequately shifted so as to establish the two shifting target values, according to the shifting model. It is noted that the output shaft angular acceleration dωo/dt is calculated from the transmission output speed ωo detected by the speed sensor 54.

By the way, it is considered possible to uniquely obtain the manipulated amounts by using a certain restricting condition in addition to the above-indicated equations (1) and (2). In the shifting control of the automatic transmission 18, it is considered difficult to control a torque transfer between the two coupling devices to be concurrently released and engaged (namely, to control a progress of the shifting action). On the other hand, where any one of the three manipulated amounts is set to be a certain value for determining the three manipulated amounts, there are available a large number of methods to set this manipulated amount. For instance, one of the three manipulated amounts is set to be a certain value depending upon the specific shifting action. If a restricting condition is set for only one of the torques of the clutches to be released and engaged, regarding this certain value of the manipulated amount, there is a risk of easy occurrence of a tie-up or racing phenomenon during the shifting action, or a risk of deterioration of ease of control to be implemented to positively cause the tie-up or racing phenomenon during the shifting action. If a restricting condition is set for a manner of change of the engine torque, on the other hand, there is a possibility of failure to implement the engine torque reduction control so as to temporarily change the engine torque in the inertia phase. In view of these possibilities, the present embodiment is configured to set, as the above-indicated restricting condition, torque assignment ratios, which are ratios of the torques to be transferred through the respective two coupling devices to be engaged and released, and which suitably represent and permit controlling the torque transfer between the two coupling devices during each shifting action and which can deal with all of the shifting actions. Namely, the inventors found it effective to set, as the above-indicated restricting condition, the torque assignment ratios which permit the torque transfer during the shifting action to be incorporated into the motion equations and which permit the manipulated amounts to be uniquely obtained. The torque assignment ratios are the ratios of the torques assigned to be transferred through the respective two coupling devices, with respect to a sum (total transmission torque) of the torques assigned to be transferred through the respective two coupling devices during the relevant shifting action of the automatic transmission 18, when the sum is represented by the torque of the input shaft 16 (total input shaft transmission torque), for instance. In the present embodiment, the torque assignment ratio of the low-gear position coupling device is represented by xlow, while the torque assignment ratio of the high-gear position coupling device is represented by xhi. These torque assignment ratios xlow and xhi are defined by the following equations (3) and (4), which include a torque assignment ratio x (0≤x≤1, for example) which changes with the time so as to reflect a transfer of the torque during the shifting action:

$$xlow = x \quad (3)$$

$$xhi = 1 - x \quad (4)$$

An equation representing a relationship between the low-gear position clutch torque Tclow and the high-gear position clutch torque Tchi can be defined by the torque assignment ratios x (=xlow) and (1−(=xhi) and on the basis of values of Tclow and Tchi converted into the torques of the input shaft 16, and the above-indicated equations (3) and (4). Relationship equations for calculating the manipulated amounts in the form of the turbine torque Tt, the low-gear position clutch torque Tclow and the high-gear position clutch torque Tchi are derived from the above-indicated equations (1) and (2) and the equation representing the relationship between Tclow and Tchi. The turbine torque Tt (equivalent to the engine torque Te) is represented by the relationship equation including x (=xlow), (1−x) (=xhi), input shaft angular acceleration $d\omega t/dt$, and transmission output torque To. Similarly, the low-gear position clutch torque Tclow is represented by the relationship equation including x (=xlow), input shaft angular acceleration $d\omega t/dt$, and transmission output torque To. Similarly, the high-gear position clutch torque Tchi is represented by the relationship equation including (1−x) (=xhi), input shaft angular acceleration $d\omega t/dt$, and transmission output torque To. Namely, according to the shifting model used in the present embodiment, the above-described manipulated amounts are calculated on the basis of the above-described shifting target values and according to the motion equations (above-indicated equations (1) and (2)) of the automatic transmission 18 including the shifting target values and the manipulated amounts, and the relationships (above-indicated equations (3) and (4)) representing the above-described torque assignment ratios. Thus, the present embodiment is configured to implement the shifting control of the automatic transmission 18 according to the shifting model, by setting the restricting condition in the form of the torque assignment ratios x, in addition to the above-indicated equations (1) and (2). Therefore, the three manipulated amounts can be adequately determined according to the above-indicated shifting model, even if there are three manipulated amounts for the two shifting target values. The predetermined shifting model is used for each of different shifting actions, more specifically, for each of the power-on shift-up and shift-down actions between the different speed positions described above. Since different sets of constants are included in the different gear train motion equations for the respective different shifting actions, a plurality of predetermined shifting models are used for the respective different shifting actions.

The shifting control of the automatic transmission 18 is implemented with respect to the different kinds of shifting action such as the power-on shift-up action, the power-off shift-up action, the power-on shift-down action and the power-off shift-down action. Accordingly, it is preferable to set the torque assignment ratios x which correspond to a specific one of the different kinds of shifting action. For example, the present embodiment is configured to implement an adequate shifting control of the automatic transmission 18, by changing the timing of change of the torque assignment ratios x according to the specific kind of shifting action, namely, to change the timing of torque transfer between the two coupling devices to be released and engaged for the shifting action, according to the specific kind of shifting action. A manner of setting the torque assignment ratios x according to the specific kinds of shifting action will be described in detail.

Figure 3A:
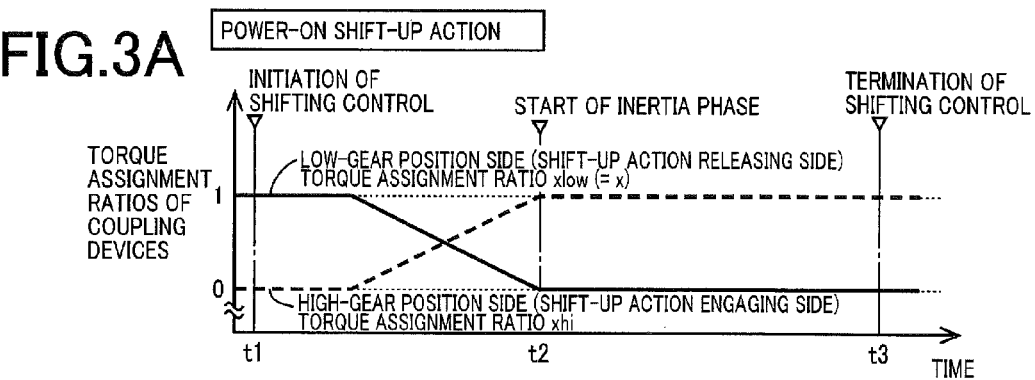
FIG. 3 are views indicating an example of timing of changing torque assignment ratios of two coupling devices of each of different shifting actions of an automatic transmission, FIGS. 3 (*a*), (*b*), (*c*) and (*d*) respectively indicating the examples in the cases of a power-on shift-up action, a power-on shift-down action, a power-off shift-up action and a power-off shift-down action.
Figure 3B:
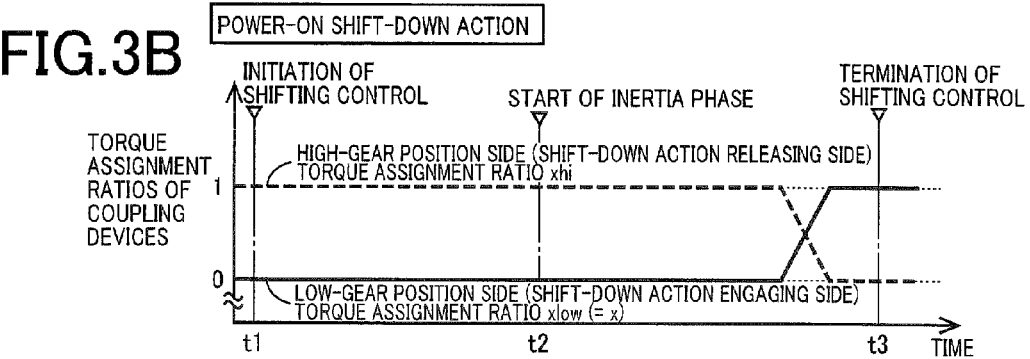
Figure 3C:
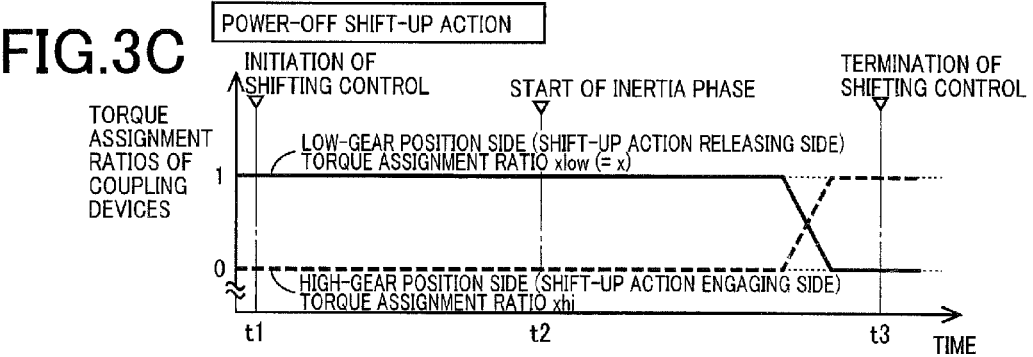
Figure 3D:
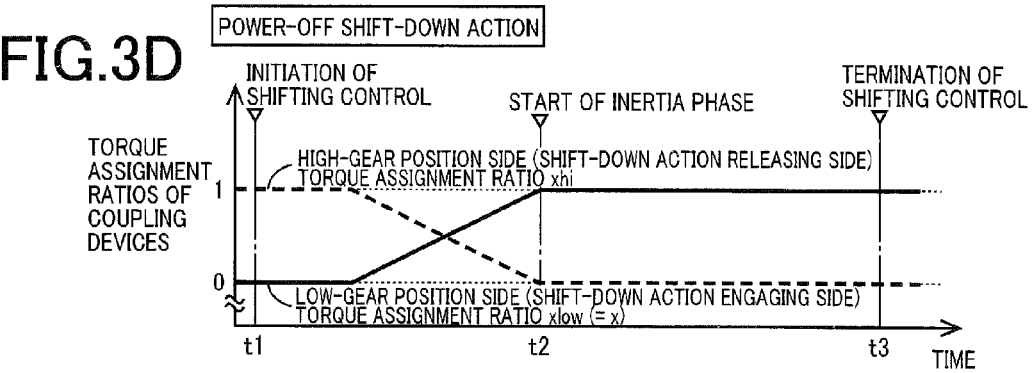

In the power-on shift-up action and the power-off shift-down action, the direction in which the turbine speed $\omega t$ (that is, transmission input speed $\omega i$) is changed with the engine torque Te (a positive value in the case of the power-on shift-up action, or a negative value (engine friction torque value) in the case of the power-off shift-down action), and the direction in which the turbine speed $\omega t$ is changed in the process of the shifting actions (the direction in which the shifting actions are performed) are opposite to each other. Namely, the power-on shift-up action and the power-off shift-down action cannot take place spontaneously with the engine torque Te, so that the power-on shift-up action and the power-off shift-down action can not be performed by merely reducing an absolute value of the clutch torque of the coupling device to be released (namely, by merely bringing this coupling device into its released), without changing the torque assignment ratios x. Hence, it is required to change the turbine speed $\omega t$ in the direction for the shifting actions, by controlling the coupling device to be engaged. For implementing adequate controls of the power-on shift-up action and the power-off shift-down action, therefore, the present embodiment is configured to change the torque assignment ratios (namely, to implement the torque transfer between the two coupling devices to be released and engaged) before a moment of initiation of the inertia phase of the shifting actions, as indicated in FIGS. 3(a) and 3(d).

In the power-off shift-up action and the power-on shift-down action, on the other hand, the turbine speed of is changed with the engine speed Te, in the direction in which the turbine speed $\omega t$ is changed in the process of the shifting actions. Namely, the power-off shift-up action and the power-on shift-down action can take place spontaneously with the engine torque Te, so that the power-off shift-up action and the power-on shift-down action can be performed by merely reducing the absolute value of the clutch torque of the coupling device to be released, without changing the torque assignment ratios x. Hence, it is not required to change the turbine speed $\omega t$ in the direction for the shifting actions, by controlling the coupling device to be engaged. If the coupling device to be engaged was controlled to perform the power-off shift-up action and the power-on shift-down action, there would arise a risk of an increase of the inertia torque and deterioration of the shifting shock of the automatic transmission 18. For implementing adequate controls of the power-off shift-up action and the power-on shift-down action, therefore, the present embodiment is configured to change the torque assignment ratios xlow and xhi at a moment of termination of the inertia phase of the shifting actions, as indicated in FIGS. 3(c) and 3(b). That is, for implementing a smooth control of the power-off shift-up action and the power-on shift-down action with a reduced degree of shifting shock of the automatic transmission 18, these shifting actions are performed by merely first bringing the coupling device to be released into its released state in consideration with the engine torque Te, and then completing the torque transfer between the two coupling devices to be released and engaged, at the moment of termination of the inertia phase, so that the turbine speed $\omega t$ of becomes coincident with a synchronizing speed to be established after completion of the shifting actions by the coupling device to be engaged. The "moment of termination of the inertia phase" is interpreted to mean a point of time at which the turbine speed $\omega t$ has changed to a value almost close to the synchronizing speed to be established after completion of the shifting actions, for example, a point of time at which the inertia phase is almost terminated. Namely, the "moment of termination of the inertia phase" is a point of time just prior to the moment of termination of the inertia phase, at which the coupling device to be engaged may be brought into its engaged state for coincidence of the turbine speed $\omega t$ with the synchronizing speed, after initiation and progress of the inertia phase with the engine torque Te and the releasing action of the coupling device to be released, without a concurrent engaging action of the coupling device to be engaged. It is noted that where the progress and termination of the inertia phase take place with the engine torque Te and the releasing action of the coupling device to be released, the torque assignment ratios x may be changed after the moment of termination of the inertia phase, rather than at the moment of termination of the inertia phase.

By the way, the automatic transmission 18 may be required to perform successive shifting actions, namely, required to perform a second shifting action, during a first shifting action. For example, the automatic transmission 18 is required to perform a power-on shift-down action from the second-speed gear position to the first-speed gear position, due to an increase of the accelerator pedal operation amount Acc or an operation of the shift lever (or a puddle switch) to shift-down the automatic transmission 18 during a power-on shift-down action from the third-speed gear position to the second-speed gear position. Alternatively, the automatic transmission 18 is required to perform a power-off shift-down action from the second-speed gear position to the first-speed gear position, due to a vehicle braking operation to decelerate the vehicle during a power-off shift-down action from the third-speed gear position to the second-speed gear position. If the second shifting action of the two successive shifting actions was performed only after the first shifting action is completed, a comparatively long length of time would be required to complete the two successive shifting actions, that is, to shift the automatic transmission 18 to the finally selected gear position. However, it is desired to more rapidly shift the automatic transmission 18 to the finally selected gear position upon requirement of two successive shifting actions. A manner of implementing the shifting control of the successive shifting actions according to shifting models in the present embodiment will be described in detail.

In the present embodiment, the electronic control device 70 is configured such that when the second shifting action of the automatic transmission 18 is required to be performed, during the first shifting action according to a predetermined first shifting model corresponding to the first shifting action, the first shifting model is switched to a second shifting model corresponding to the second shifting action, to implement the shifting control of the automatic transmission 18 for performing the second shifting action according to the second shifting model. The first shifting model is switched to the second shifting model, by switching the shifting target values corresponding to the first shifting model to the shifting target values corresponding to the second shifting model, and by switching first gear train motion equations corresponding to the first shifting model to second gear train motion equations corresponding to the second shifting model. The first and second gear train motion equations include respective different sets of constants.

Described more specifically by reference to FIG. 2, the shifting control portion 74 is configured to determine whether the automatic transmission 18 is in a shifting action, depending upon whether the shifting action required to be performed is terminated or not, for example. The shifting control portion 74 is further configured to determine whether the automatic transmission 18 is required to perform the second shifting action, during the first shifting action (that is, to perform the two successive shifting actions, with the second shifting action being required during the first shifting action).

If the shifting control portion 74 does not determine that the automatic transmission 18 is required to perform the successive shifting actions, the manipulated amount calculating means in the form of a manipulated amount calculating portion 76 calculates the above-described manipulated amounts on the basis of the above-described shifting target values and according to the above-described shifting model. If the shifting control portion 74 determines that the automatic transmission 18 is required to perform the successive shifting actions, namely, required during the first shifting action to perform the second shifting action, the manipulated amount calculating portion 76 switches the shifting model corresponding to the first shifting action, to the shifting model corresponding to the second shifting model, namely, to switch the shifting target values and the gear train motion equations corresponding to the first shifting action, to the shifting target values and the gear train motion equations corresponding to the second shifting action. Then, the manipulated amount calculating portion 76 calculates the manipulated amounts according to the shifting model corresponding to the second shifting action, and on the basis of the shifting target values corresponding to the second shifting action. The manipulated amount calculating portion 76 includes the torque assignment ratio calculating means in the form of a torque assignment ratio calculating portion 78, and the shifting target value calculating means in the form of a shifting target value calculating portion 80.

The torque assignment ratio calculating portion 78 is configured to calculate the torque assignment ratio x on the basis of a length of time lapse from a moment of initiation of the shifting control (or a moment of calculation of the ratio x in the last control cycle) and according to a predetermined relationship (shifting progress map) representing the manner of change of the torque assignment ratio x, for example. Then, the torque assignment ratio calculating portion 78 calculates the torque assignment ratio xlow of the low-gear position coupling device and the torque assignment ratio xhi of the high-gear position coupling device on the basis of the calculated torque assignment ratio x and according to the above-indicated equations (3) and (4). It is noted that the above-indicated shifting progress map is determined for each of the specific shifting actions and for each of the combinations of the two shift positions between which the relevant shifting action takes place, and that an initial value of the torque assignment ratio x is set to be 1 for each shift-up action, and to be 0 for each shift-down action.

The shifting target value calculating portion 80 is configured to calculate the target value of the input shaft angular acceleration dωt/dt in the inertia phase on the basis of the length of time lapse from a moment of initiation of the inertia phase (or a moment of calculation of the angular acceleration dωt/dt in the last control cycle) and according to a predetermined relationship (input shaft angular acceleration change map) representing the manner of change of the input shaft angular acceleration dωt/dt such that the turbine speed ωt (=transmission input speed ωi) in the inertia phase changes so as to provide a best compromise between reduction of the shifting shock and the required shifting time, for instance. The shifting target value calculating portion 80 is further configured to calculate the target value of the input shaft angular acceleration tωt/dt in the phase other than the inertia phase, on the basis of a change of the turbine speed ωt (=transmission input speed ωi), for instance. The shifting target value calculating portion 80 is also configured to calculate the target value of the transmission output torque To on the basis of the required drive force Fdem calculated by the engine output control portion 72 and the length of time lapse from the moment of initiation of the shifting control (or a moment of calculation of the required drive force Fdem in the last control cycle) and according to a predetermined relationship (transmission output torque change map) representing the manner of change of the transmission output torque To, for instance. It is noted that the above-indicated input shaft angular acceleration change map and transmission output torque change map are determined for each of the different kinds of shifting action (for each of the power-on and power-off shift-up and shift-down actions and for each of the combinations of the two shift positions between which the relevant shifting action takes place).

The manipulated amount calculating portion 76 calculates, as the above-described manipulated amounts, each of required values of the turbine torque Tt (equivalent to the engine torque Te), the low-gear position clutch torque Tclow and the high-gear position clutch torque Tchi, on the basis of the torque assignment ratios (x, xlow, xhi) of the two coupling devices calculated by the torque assignment ratio calculating portion 78, and the shifting target values (dωt/dt and To) calculated by the shifting target value calculating portion 80, and according to the relationship equations for calculating the manipulated amounts.

The engine output control portion 72 generates the engine output control command signals Se so as to obtain the required value of the turbine torque Tt (equivalent to the engine torque Te) calculated by the manipulated amount calculating portion 76. The shifting control portion 74 applies to the hydraulic control unit 28, the hydraulic command signals Sp for obtaining the required values of the low-gear position clutch torque Tclow and the high-gear position clutch torque Tchi calculated by the manipulated amount calculating portion 76, such that the automatic transmission 18 is shifted to the determined gear position.

Figure 5:
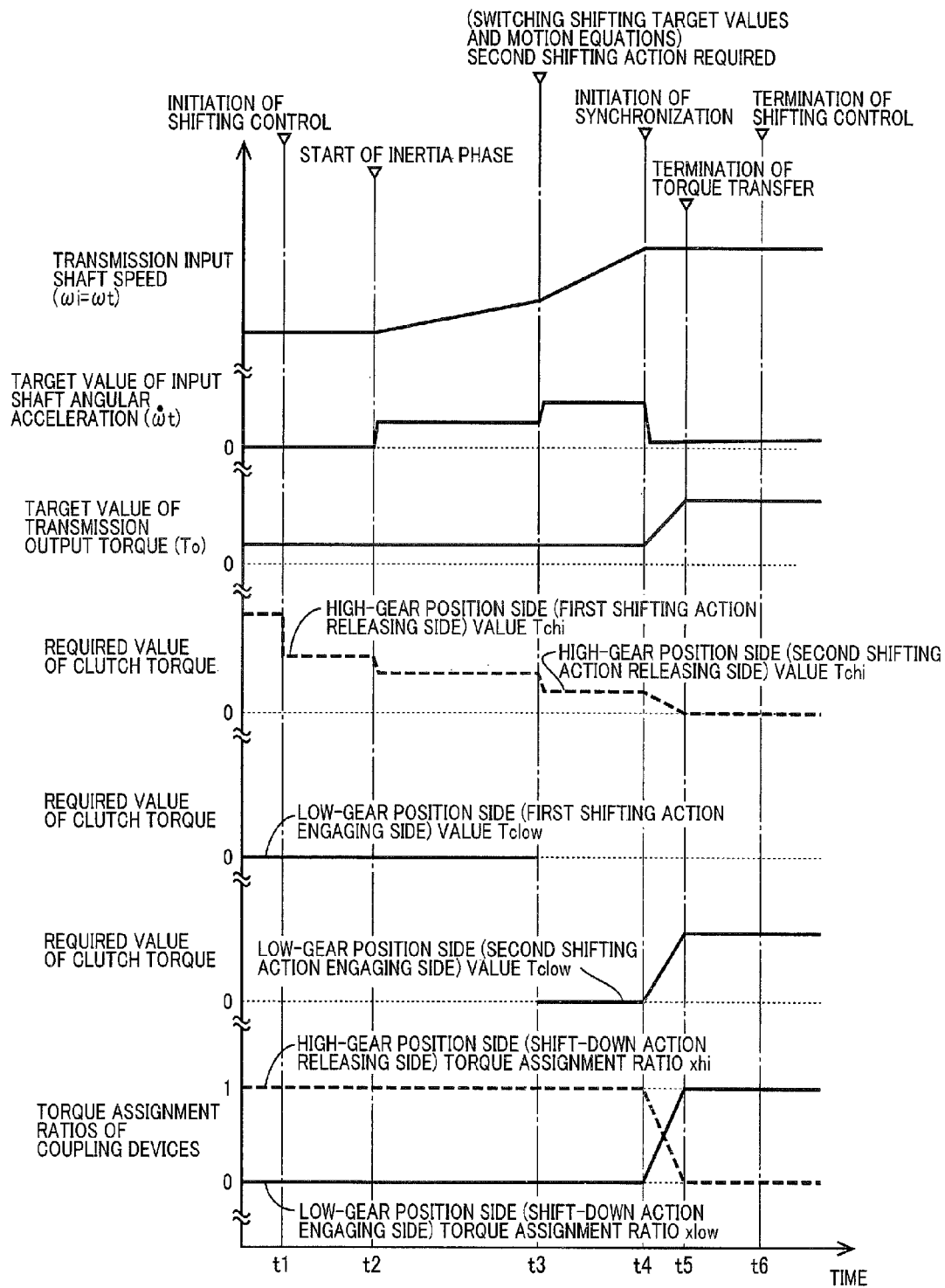
FIG. 5 is a time chart illustrating the control operation shown in the flow chart of FIG. 4, when the power-on shift-down actions are performed.

FIG. 4 is the flow chart for explaining a major control operation of the electronic control device 70, namely, a control operation to permit an adequate shifting control of the automatic transmission 18 according to a shifting model even where the automatic transmission 18 is required to perform successive shifting actions. The control operation is repeatedly implemented with an extremely short cycle time of about several milliseconds to about several tens of milliseconds, for example. FIG. 5 is the time chart illustrating an example of the control operation shown in the flow chart of FIG. 4, when the power-on shift-down actions of the automatic transmission 18 are performed.

The control operation of FIG. 4 is initiated with a step S10 corresponding to the shifting control portion 74, to determine whether the automatic transmission 18 is in a shifting action. If a negative determination is obtained in the step S10, the present routine is terminated. If an affirmative determination is obtained in the step S10, the control flow goes to a step S20 corresponding to the shifting control portion 74, to determine whether the automatic transmission 18 is required to perform two successive shifting actions (during a time period from a point of time t1 in FIG. 5). If a negative determination is obtained in the step S20 (during a time period from the point of time t1 to a point of time t3 in FIG. 5), the control flow goes to a step S30 corresponding to the torque assignment ratio calculating portion 78, to calculate the torque assignment ratios (x, xlow and xhi) of the relevant coupling devices according to the above-described shifting progress map, for example. Then, the control flow goes to a step S40 corresponding to the shifting target value calculating portion 80, to calculate the shifting target values (target values of input shaft angular acceleration dωt/dt and transmission output torque To). The control flow then goes to a step S50 corresponding to the manipulated amount calculating portion 76, to calculate the manipulated amounts (required values of engine torque Te, low-gear position clutch torque Tclow and high-gear position clutch torque Tchi) on the basis of the torque assignment ratios of the coupling devices calculated in the step S30 and the shifting target values calculated in the step S40, and according to the above-described relationship equations formulated to calculate the manipulated amounts. Then, the control flow goes to a step S60 corresponding to the engine output control portion 72 and the shifting control portion 74, to generate the engine output control command signals Se and the hydraulic command signals Sp, for controlling the engine 12, the coupling device to be released, and the coupling device to be engaged, such that the manipulated amounts calculated in the step S50 are obtained. If an affirmative determination is obtained in the step S20, on the other hand, the control flow goes to a step S70 corresponding to the manipulated amount calculating portion 76, to switch the shifting model corresponding to the first shifting action (detected in the step S10), to a shifting model corresponding to the second shifting action of the two successive shifting actions (required in the step S20), namely, to switch the shifting target values and the gear train motion equations corresponding to the first shifting action, to the shifting target values and the gear train motion equations corresponding to the second shifting action (at the point of time t3 in FIG. 5). This step S70 is followed by the step S30 and the following steps. That is, the manipulated amounts for the second shifting action are calculated according to the shifting model corresponding to the second shifting action, in a manner similar to the manner in which the manipulated amounts for the first shifting action are calculated according to the shifting model corresponding to the first shifting action where the negative determination is obtained in the step S20. The second shifting action is performed according to the calculated manipulated amounts (during a time period from the point of time t3 to a point of time t6 in FIG. 5). When the second shifting action after the two successive shifting action is required, is in progress, the determination in step S20 is whether another two successive shifting actions is required during the second shifting action. That is, during the second shifting action of the two successive shifting actions is in progress, the negative determination is obtained in the step S20 unless a shifting action other than the second shifting action is required.

Referring to FIG. 5, the shifting control of the automatic transmission 18 for the first shifting action is initiated at the point of time t1, and implemented according to the manipulated amounts calculated on the basis of the shifting target values calculated according to the first shifting model corresponding to the first shifting action. When the second shifting action is required (at time t3) during the inertia phase of the first shifting action (during the time period from the point of time t2), the first shifting model corresponding to the first shifting action is switched to the second shifting model corresponding to the second shifting action. In this case, the manipulated amounts for the second shifting action are calculated on the basis of the shifting target values calculated according to the second shifting model, and the second shifting action is performed according to the calculated manipulated amounts (during the time period from the point of time t3 to the point of time t6 in FIG. 5), as in the case where the first shifting action is performed. In the example of FIG. 5 in which the power-on shift-down actions are performed, the torque assignment ratios x are changed at a moment of termination of the inertia phase (during a time period from a point of time t4 to a point of time t5 in FIG. 5) at which the transmission input speed ωi becomes almost coincident with the synchronizing speed to be established after the shifting action, so that the shifting control is adequately implemented. As described above, the present embodiment is configured such that where the second shifting action is required during the first shifting action, the automatic transmission 18 is shifted directly to the final gear position to be established by the second shifting position, so that the second shifting action can be completed in a shorter length of time, than in the case where the automatic transmission 18 is once shifted to the original gear position to be established by the first shifting action, and then shifted to the final gear position to be established by the second shifting action. Accordingly, a response of the automatic transmission 18 to the required vehicle drive force Fdem (vehicle acceleration, for instance) is improved in the case of the power-on shift-down action.

As described above, the transmission shifting control apparatus in the form of the electronic control device 70 according to the present embodiment is configured to use the torque assignment ratios x as the restricting condition, in view of the finding that the above-indicated equations (1) and (2) cannot be solved unless a certain restricting condition is set. Accordingly, the torque transfer between the two coupling devices during a shifting action, which would otherwise be considered difficult to control, can be adequately controlled by solving the equations. Described in a different way, the torque assignment ratios x representative of the torque transfer are set as the restricting condition, so that a predetermined shifting model can deal with all of different shifting actions. Described more specifically, the torque assignment ratios x suitable for controlling a progress of the shifting action are used as the restricting condition, so that it is possible to reduce a risk of easy occurrence of a tie-up or racing phenomenon, or to improve ease of control to be implemented for positively causing the tie-up or racing phenomenon to the contrary. Further, the engine torque reduction control can be adequately implemented. Thus, the present embodiment permits adequate determination of the three manipulated amounts according to the shifting model, and a desired shifting control of the automatic transmission 18 so as to establish the two shifting target values, although the three manipulated amounts are used for the two shifting target values.

The transmission shifting control apparatus in the form of the electronic control device 70 is further configured such that when the second shifting action of the automatic transmission 18 is required to be performed, during the preceding first shifting action according to the predetermined first shifting model, the manipulated amount calculating portion 76 switches the first shifting model to the second shifting model corresponding to the second shifting action, to implement the shifting control of the automatic transmission 18 for performing the second shifting action according to the second shifting model, so that the automatic transmission 18 can be shifted to the desired final shift or gear position in a shorter length of time than in the case where the second shifting action to the final shift position is performed only after the first shifting action is completed. Accordingly, the response of the automatic transmission 18 to the required vehicle drive force Fdem is improved. Thus, the transmission shifting control apparatus according to the present embodiment permits a more adequate shifting control of the automatic transmission 18 according to an appropriate shifting model.

The present embodiment is further configured to calculate the manipulated amounts on the basis of the shifting target values, by using the motion equations in the form of the above-indicated equations (1) and (2), and the relationships in the form of the above-indicated equations (3) and (4), so that the three manipulated amounts can be adequately determined according to the above-indicated motion equations formulated to implement the control of the torque transfer between the two coupling devices during a shifting action, which would otherwise be considered difficult.

Other embodiments of this invention will be described. In the following description, the same reference signs will be used to identify the corresponding elements in the different embodiments, which will not be described redundantly.

Second Embodiment

In the first embodiment described above, the first shifting model corresponding to the first shifting action is switched to the second shifting model corresponding to the second shifting action as soon as the second shifting action is required during the first shifting action, and the second shifting action is performed according to the second shifting model. By the way, when the second shifting action is performed during the torque transfer between the two relevant coupling devices while the torque assignment ratios xlow and xhi are changed during the first shifting action, the manipulated amount calculating portion 76 should set a total of four manipulated amounts, that is, the clutch torque of the coupling device to be engaged for the second shifting action, in addition to the engine torque Te, the clutch torque of the coupling device to be engaged for the first shifting action, the clutch torque of the coupling device to be released for the first shifting action. Namely, there are four manipulated amounts for the two shifting target values, so that the gear train motion equations cannot be uniquely solved.

In view of the fact described above, the present second embodiment is configured such that the first shifting model is not switched to the second shifting model, to inhibit the second shifting action while the torque assignment ratios xlow and xhi are changed during the first shifting action of the automatic transmission 18, even when it is determined that the second shifting action is required during the first shifting action, that is, where the gear train motion equations cannot be solved. Namely, the electronic control device 70 is configured to permit switching to the second shifting model corresponding to the second shifting action, only where the second shifting action is required while the torque assignment ratios xlow and xhi are not changed during the first shifting action. For example, the electronic control device 70 permits switching to the second shifting model only after termination of change of the torque assignment ratios xlow and xhi during the first shifting action, when it is determined that the second shifting action is required during the first shifting action. In this respect, it is noted that the "torque transfer" during each shifting action is interpreted to mean changes of the clutch torques of both of the two relevant coupling devices to be engaged and released, and does not comprehend a change of only one of the two coupling devices while the torque assignment ratios xlow and xhi are not changed. Thus, the "torque transfer" should involve the changes of the torque assignment ratios xlow and xhi.

Described more specifically, when the shifting control portion 74 has determined that the successive shifting actions are required to be performed, the manipulated amount calculating portion 76 is configured to determine whether the torque assignment ratios xlow and xhi of the two coupling devices calculated by the torque assignment ratio calculating portion 78 are being changed or not (whether the torque assignment ratios xlow and xhi are kept at the values calculated in the last control cycle, or not, for example). If it is determined that the torque assignment ratios xlow and xhi are being changed, the manipulated amount calculating portion 76 continues calculation of the manipulated amounts according to the first shifting model corresponding to the first shifting action, until it is determined that the torque assignment ratios xlow and xhi are not being changed. If it is determined that the torque assignment ratios xlow and xhi are not being changed, on the other hand, the manipulated amount calculating portion 76 switches the first shifting model corresponding to the first shifting action, to the second shifting model corresponding to the second shifting action.

Figure 6:
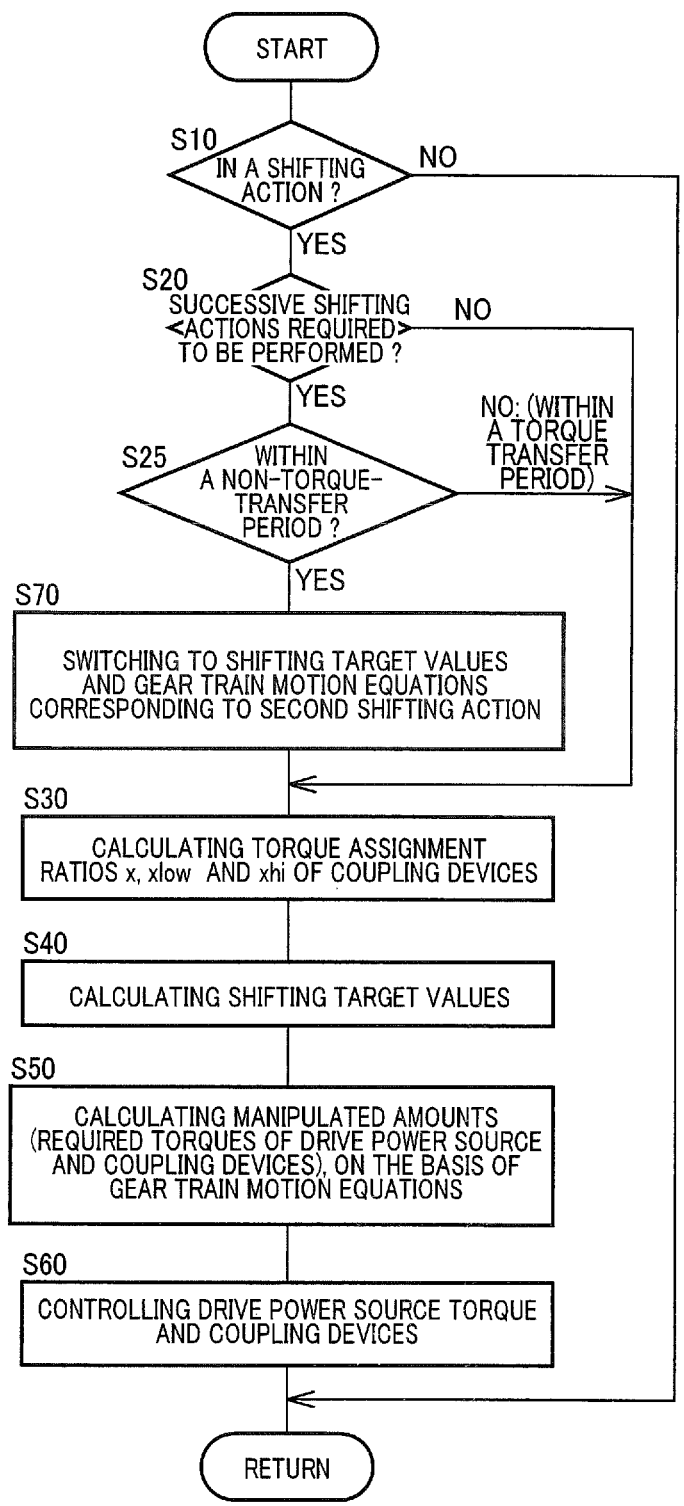
FIG. 6 is a flow chart for explaining a major control operation of the electronic control device, namely, a control operation to permit a more adequate shifting control of desired shifting in the automatic transmission according to a shifting model in another embodiment of the invention in place of an embodiment of FIG. 4.
Figure 7:
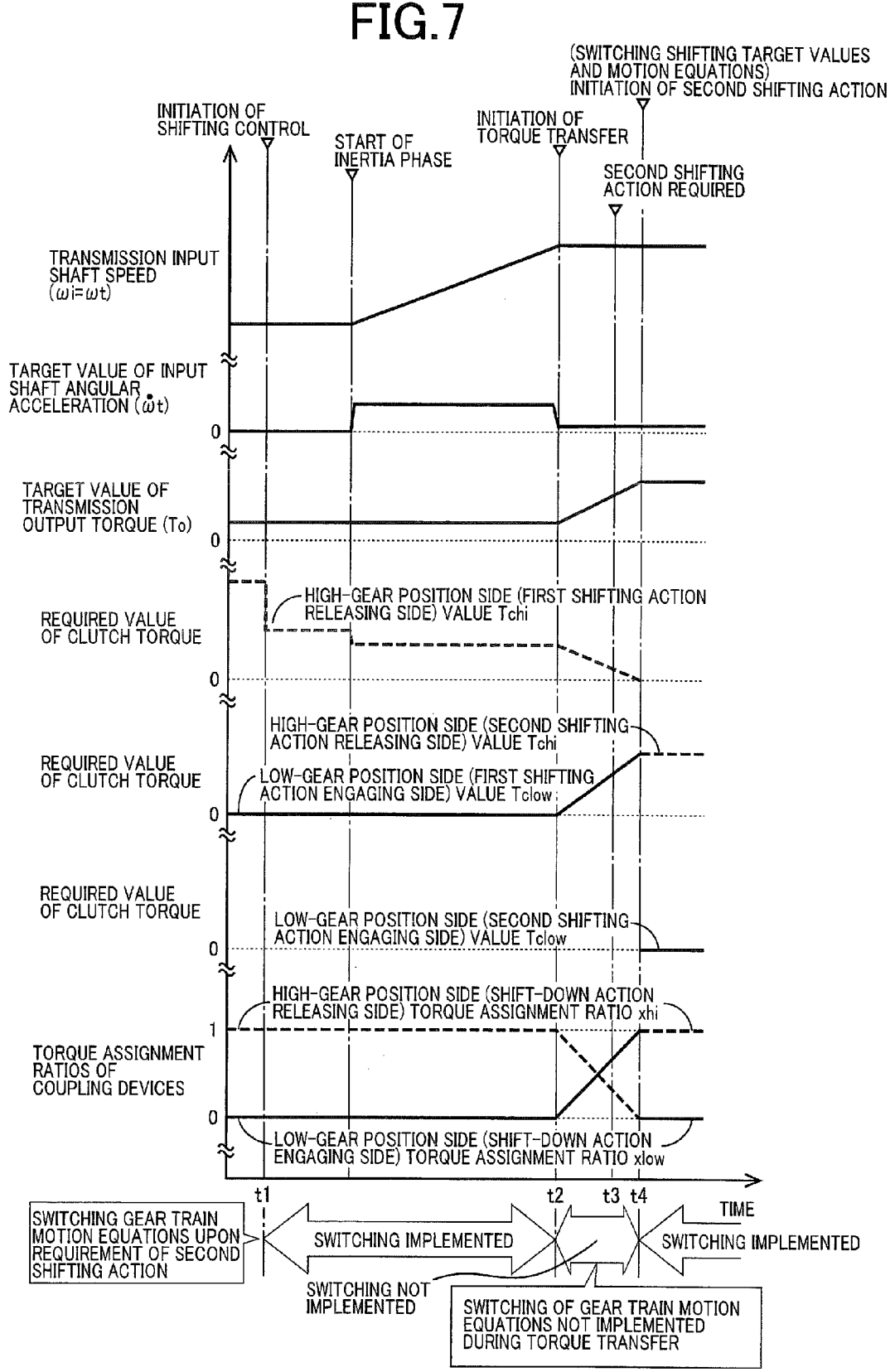
FIG. 7 is a time chart illustrating the control operation shown in the flow chart of FIG. 6, when the power-on shift-down actions are performed.

FIG. 6 is the flow chart for explaining a major control operation of the electronic control device 70, namely, a control operation to permit a more adequate shifting control of the automatic transmission 18 according to a shifting model in the present second embodiment of the invention. This control operation is repeatedly implemented with an extremely short cycle time of about several milliseconds to about several tens of milliseconds, for example. FIG. 7 is the time chart illustrating the control operation shown in the flow chart of FIG. 6, when the power-on shift-down actions are performed. FIG. 6 showing the second embodiment corresponds to FIG. 4 showing the first embodiment. Only those aspects of the second embodiment which are different from the first embodiment of FIG. 4 will be described.

If the affirmative determination is obtained in the step S20 in the flow chart of FIG. 6 (at the point of time t3 in FIG. 7), the control flow goes to a step S25 corresponding to the manipulated amount calculating portion 76, to determine whether the present point of time is within a non-torque-transfer period in which the torque assignment ratios xlow and xhi are not changed. If the negative determination is obtained in the step S20 (during the time period from the point of time t1 to the point of time t3 in FIG. 7), or if a negative determination is obtained in the step S25, that is, if the present point of time is within a torque transfer period (during a time period from the point of time t2 to the point of time t4 in FIG. 7), the control flow goes to the step S30 and the following steps S40, S50 and S60. If an affirmative determination is obtained in the step S25, the control flow goes to a step S70 corresponding to the manipulated amount calculating portion 76 (at the point of time t4 in FIG. 7), and then to the steps S30-S60 to perform the second shifting action (during a time period after the point of time t4 in FIG. 7).

In the example of FIG. 7, the shifting control of the automatic transmission 18 for the first shifting action is initiated (at the point of time t1) on the basis of the required values of the manipulated amounts determined to establish the shifting target values according to the first shifting model corresponding to the first shifting action. The first shifting model is not switched to the second shifting model corresponding to the second shifting action, even if it is determined (at the point of time t3) that the second shifting action is required while the torque assignment ratios xlow and xhi are being changed (during the time period from the point of time t2 to the point of time t4). After the changes of the torque assignment ratios xlow and xhi are completed, the first shifting model corresponding to the first shifting action is switched to the second shifting model corresponding to the second shifting action (at the point of time t4), and the second shifting action is performed (during the time period after the point of time t4). In this example of FIG. 7, the shifting model is switched to the second shifting model corresponding to the second shifting action if it is determined, within the time period from the point of time t1 to the point of time t2 or within the time period after the point of time t4, that the second shifting action is required during the first shifting action. However, the shifting model is not switched to the second shifting model if it is determined, during the time period from the point of time t2 to the point of time t4, that the second shifting action is required during the first shifting action. Thus, the second embodiment is configured to inhibit the second shifting action where the two successive shifting actions are required during the first shifting action while the torque assignment ratios xlow and xhi are being changed (that is, where the manipulated amount calculating portion 76 should set the above-described four manipulated amounts). That is, the second shifting action is permitted only while the torque assignment ratios xlow and xhi are not being changed, so that the three manipulated amounts can be uniquely determined for the second shifting action.

The present second embodiment described above has substantially the same advantages as the first embodiment described above. In addition, the second embodiment is configured such that the manipulated amount calculating portion 76 does not switch the first shifting model to the second shifting model, and thus inhibits the second shifting action, where the second shifting action is required during the first shifting action while the torque assignment ratios xlow and xhi are being changed, so that it is possible to prevent a failure to solve the shifting model. Stated in a different way, the manipulated amount calculating portion 76 permits switching to the second shifting model corresponding to the second shifting action only while the torque assignment ratios are not being changed, so that the manipulated amount calculating portion 76 can set the three manipulated amounts for the two shifting target values, whereby the automatic transmission 18 can adequately be shifted to the desired final shift or gear position according to the second shifting model.

The present second embodiment is further configured such that when the second shifting action is required to be performed, during the first shifting action while the torque assignment ratios xlow and xhi are being changed, the manipulated amount calculating portion 76 switches the first shifting model to the second shifting model after changes of the torque assignment ratios are terminated. Accordingly, the automatic transmission 18 can be shifted to the desired final shift position in a shorter length of time than where the second shifting action is initiated only after the first shifting action is completed, although the length of time required to shift the automatic transmission 18 to the final shift position is increased due to initiation of the second shifting action after termination of the changes of the torque assignment ratios xlow and xhi.

Third Embodiment

In the second embodiment described above, the first shifting model corresponding to the first shifting action is switched to the second shifting model corresponding to the second shifting action only after the torque transfer for the first shifting action is completed, where it is determined that the second shifting action is required during the torque transfer. By the way, where it is determined that the second shifting action is required during the torque transfer for the first shifting action, a length of time required for returning the torque assignment ratios xlow and xhi back to the original values prior to initiation of the torque transfer may be shorter than a length of time required for completion of the torque transfer. In this case, it is more advantageous to return the torque assignment ratios xlow and xhi back to the original values, than to proceed with completion of the torque transfer, in that the successive shifting actions of the automatic transmission 18 can be completed in a shorter length of time.

In view of the possibility described above, the electronic control device 70 according to the present third embodiment is configured such that if the torque assignment ratios xlow and xhi are returned to the original values prior to initiation of their changes where it is determined that the second shifting action is required during the changes of the torque assignment ratios xlow and xhi during the first shifting action, the first shifting model is switched to the second shifting model after the torque assignment ratios xlow and xhi have been returned back to the original values. The torque assignment ratios xlow and xhi are returned to the original values if a ratio of progress of the changes of the ratios xlow and xhi (amounts of changes of the ratios xlow and xhi during a time period from the moment of initiation of the changes to the present point of time/total amounts of changes of the ratios xlow and xhi during an entire time period of the changes) is lower than a predetermined threshold value. This threshold value is determined such that when the ratio of progress of the changes of the ratios xlow and xhi is lower than the threshold value, the length of time required for returning the ratios xlow and xhi back to the original values prior to the initiation of the torque transfer is shorter than the length of time required for completion of the changes of the ratios xlow and xhi.

Described more specifically, where the manipulated amount calculating portion 76 has determined that the torque assignment ratios xlow and xhi are being changed, the manipulated amount calculating portion 76 determines whether the ratios xlow and xhi should be returned to the original values or not, depending upon whether the ratio of progress of changes of the ratios xlow and xhi is lower than the predetermined threshold value (0.5, for instance). If the manipulated amount calculating portion 76 has determined that the ratios xlow and xhi should be returned to the original values, the manipulated amount calculating portion 76 switches the shifting target values and the torque assignment ratios xlow and xhi from the present values back to the original values.

Figure 8:
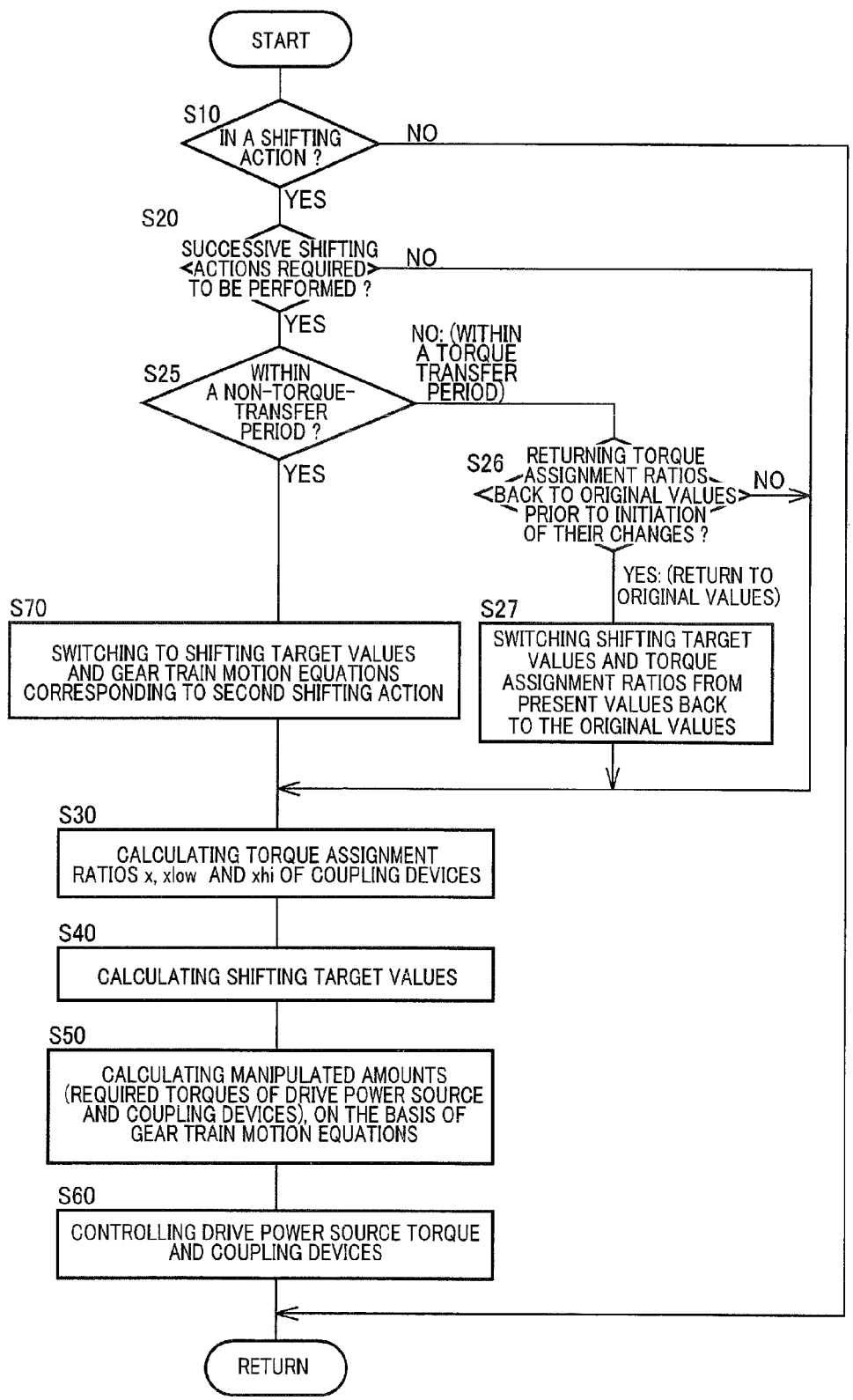
FIG. 8 is a flow chart for explaining a major control operation of the electronic control device, namely, a control operation to permit a more adequate shifting control of desired shifting in the automatic transmission according to a shifting model in a further embodiment of the invention in place of the embodiments of FIGS. 4 and 6.
Figure 9:
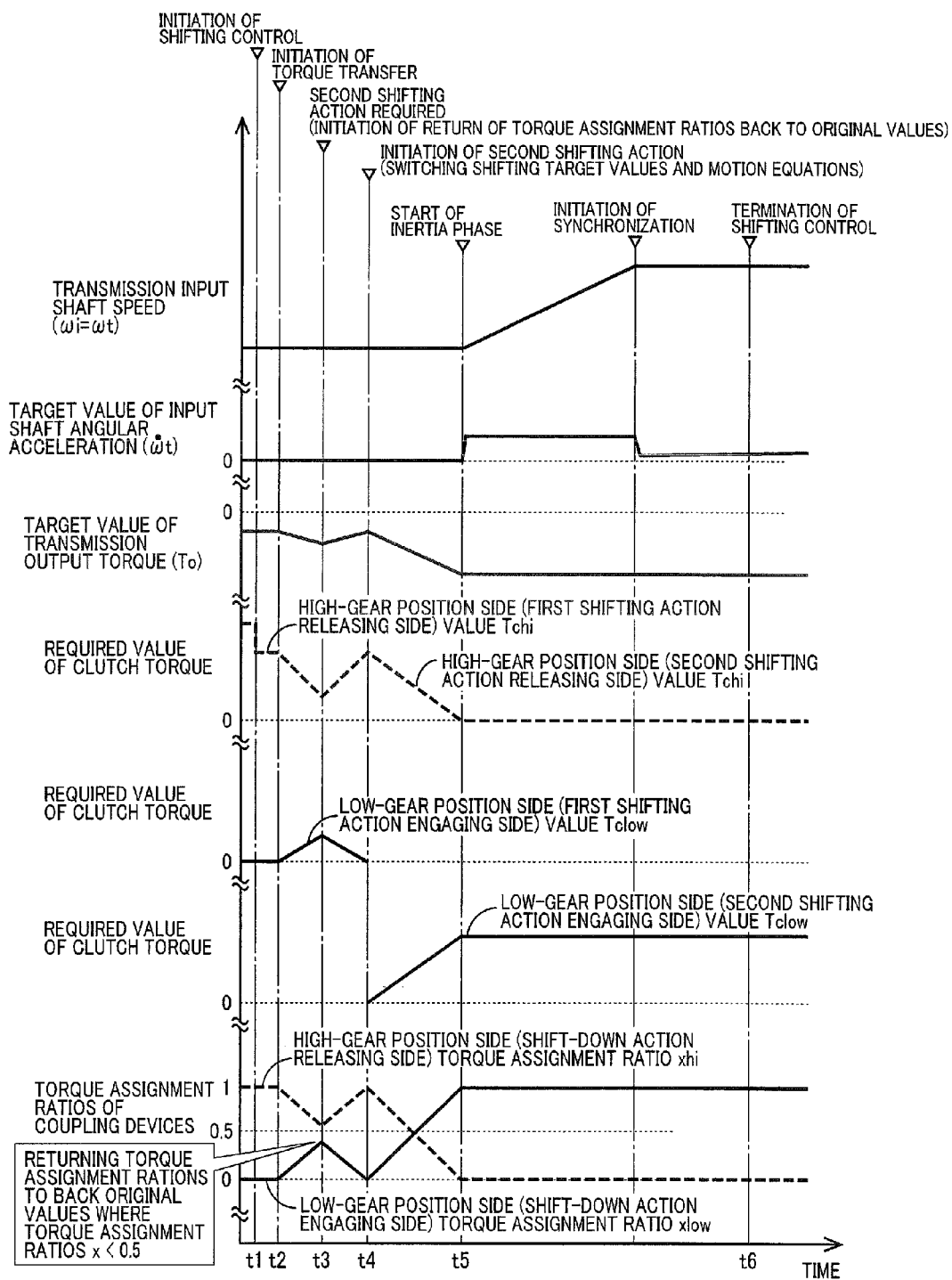
FIG. 9 is a time chart illustrating an example of the control operation shown in the flow chart of FIG. 8, when the power-off shift-down action is performed.

FIG. 8 is the flow chart for explaining a major control operation of the electronic control device 70, namely, a control operation to permit a more adequate shifting control of the automatic transmission 18 according to a shifting model in the present third embodiment of the invention. This control operation is repeatedly implemented with an extremely short cycle time of about several milliseconds to about several tens of milliseconds, for example. FIG. 9 is the time chart illustrating an example of the control operation shown in the flow chart of FIG. 8, when the power-off shift-down actions are performed. FIG. 8 showing the third embodiment corresponds to FIGS. 4 and 6 showing the first and second embodiments. Only those aspects of the third embodiment which are different from the second embodiment of FIG. 6 will be described.

In the flow chart of FIG. 8, the step S25 is implemented to determine whether the present point of time is within the non-torque-transfer period in which the torque assignment ratios xlow and xhi are not changed. If the negative determination is obtained in the step S25 (during a time period from a point of time t2 to a point of time t4 in FIG. 9), that is, if the torque assignment ratios xlow and xhi are being changed, the control flow goes to a step S26 corresponding to the manipulated amount calculating portion 76, to determine whether the torque assignment ratios xlow and xhi should be returned to the original values prior to the moment of initiation of the changes of the ratios xlow and xhi. In this respect, it is noted that the negative determination is obtained in the step S25 also while the torque assignment ratios xlow and xhi are being changed toward the original values. If the negative determination is obtained in the step S20 (during a time period from a point of time t1 to a point of time t3 in FIG. 9), or if a negative determination is obtained in the step S26 (during a time period from the point of time t3 to the point of time t4 in FIG. 9) due to the ratio of progress of changes of the ratios xlow and xhi equal to or higher than the predetermined threshold value (or while the ratios xlow and xhi are being returned back to the original values), the control flow goes to the step S30 and the following steps S40-S60. If an affirmative determination is obtained in the step S26 (at the point of time t3 in FIG. 9), the control flow goes to a step S27 corresponding to the manipulated amount calculating portion 76, to switch the shifting target values and the torque assignment ratios xlow and xhi from the present values back to the original values. If the affirmative determination is obtained in the step S25, on the other hand, the control flow goes directly to the step S70 corresponding to the manipulated amount calculating portion 76 (at the point of time t4 in FIG. 9). The step S70 is followed by the steps S30-S60 in which the second shifting action is performed as described above (during a time period from the point of time t4 to a point of time t6 in FIG. 9).

In the example of FIG. 9, the required values of the manipulated amounts for establishing the shifting target values are determined according to the first shifting model corresponding to the first shifting action, and the shifting control of the automatic transmission 18 for the first shifting action is initiated (at the point of time t1). If the ratio of progress of the changes of the torque assignment ratios xlow and xhi is lower than the predetermined threshold value where it is determined (at the point of time t3) that the second shifting action is required during the first shifting action while the ratios xlow and xhi are being changed (during the time period after the point of time t2), the ratios xlow and xhi are returned (during the time period from the point of time t3 to the point of time t4) back to the original values prior to the moment of initiation of their changes. The first shifting model corresponding to the first shifting action is not switched to the second shifting model corresponding to the second shifting action while the torque assignment ratios xlow and xhi are being returned to the original values (during the time period from the point of time t2 to the point of time t4). After the torque assignment ratios xlow and xhi have been returned back to the original values, the first shifting model is switched to the second shifting model (at the point of time t4), and the second shifting action is performed according to the second shifting model (during the time period from the point of time t4 to the point of time t6). In the example of FIG. 9 wherein the power-off shift-down actions are performed, the torque assignment ratios xlow and xhi are changed before the moment of initiation of the inertia phase (before the point of time t5), to assure an adequate shifting control of the automatic transmission 18. Thus, the present third embodiment is configured such that while the torque assignment ratios xlow and xhi are changed for the first shifting action during which the second shifting action is required, the torque assignment ratios xlow and xhi are either continuously changed to the predetermined final values, or returned back to the original values, depending upon the present ratio of progress of changes of the ratios xlow and xhi, so that the second shifting action can be completed within a further shorter length of time. Accordingly, the response of the automatic transmission 18 to the required vehicle drive force Fdem (vehicle deceleration value, for instance) can be improved where the power-off shift-down actions are performed.

The present third embodiment described above has substantially the same advantages as the second embodiment described above. In addition, the transmission shifting control apparatus according to the third embodiment is configured such that the torque assignment ratios xlow and xhi are returned back to the original values prior to the moment of initiation of their changes for the first shifting action during which the second shifting action is required to be performed, the manipulated amount calculating portion 76 switches the first shifting model corresponding to the first shifting action to the second shifting model corresponding to the second shifting action after the torque assignment ratios xlow and xhi have been returned to the original values. Accordingly, the automatic transmission 18 can be shifted to the desired final shift position within a further shorter length of time, where the length of time required for returning the torque assignment ratios xlow and xhi back to the original values prior to the moment of initiation of their changes is shorter than the length of time required for completion of the changes to predetermined final values. Accordingly, the response of the automatic transmission 18 to the required vehicle drive force Fdem is further improved.

While the preferred embodiments of this invention have been described in detail by reference to the drawings, it is to be understood that the invention may be otherwise embodied.

Although the illustrated embodiments are independent of each other, the embodiments need not be independent of each other, and may be combined with each other as needed.

In the illustrated embodiments, the output shaft 20 per se is illustrated as the rotary member disposed on the side of the output shaft 20. However, the rotary member on the side of the output shaft 20 is not limited to the output shaft 20 per se, and may be replaced by any other rotary member disposed in the power transmitting path from the output shaft 20 to the drive wheels 26. While the input shaft 16 per se is used as the rotary member disposed on the side of the input shaft 16, the rotary member on the side of the input shaft 16 is not limited to the input shaft 16 per se, and may be replaced by any other rotary member in the power transmitting path from the engine 12 to the input shaft 16.

While the illustrated embodiments relate to the successive shift-down actions of the automatic transmission 18, the principle of the present invention is equally applicable to successive shift-up actions, or successive shift-down and shift-up actions.

In the illustrated third embodiment, the determination as to whether the torque assignment ratios x are returned to the original values or not is made on the basis of the ratio of progress of changes of the torque assignment ratios xlow and xhi. However, a degree of change of the required vehicle drive force Fdem, and amounts of heat absorption by the relevant two coupling devices, for example, may be used in place of, or in addition to the progress of change of the torque assignment ratios xlow and xhi, to make the determination. Described more specifically, the torque assignment ratios xlow and xhi are not returned back to the original values, if the degree of change of the required vehicle drive force Fdem is higher than a threshold value above which the shifting shock of the automatic transmission 18 is excessively large, or if the amounts of heat absorption of the relevant coupling devices are larger than a threshold value above which the durability of the coupling devices is deteriorated.

In the control operations illustrated in the flow charts of FIGS. 4, 6 and 8, the step S40 may be implemented before the step S30.

While the embodiments and modifications have been described for illustrative purpose only, it is to be understood that the invention may be embodied with various other changes and improvements which may occur to those skilled in the art.

NOMENCLATURE OF REFERENCE SIGNS

10: Vehicle
12: Engine (Drive power source)
16: Input shaft
18: Automatic transmission
20: Output shaft
26: Drive wheels
70: Electronic control device (Transmission shifting control apparatus)
B1, B2: Brakes (Coupling devices)
C: Clutches (Coupling device)

The invention claimed:

1. A transmission shifting control apparatus for a vehicle including an automatic transmission which comprises a plurality of coupling devices for transmitting a rotary motion and a torque between an input shaft provided to receive a drive force from a drive power source and an output shaft provided to transmit the drive force to drive wheels, and which is configured to be shifted with concurrently performed engaging and releasing actions of the respective coupling devices, said control apparatus being configured to implement a shifting control of said automatic transmission according to a predetermined shifting model for determining manipulated amounts to establish shifting target values, the control apparatus comprising:

a shifting target value calculating portion configured to set, as said shifting target values, a torque of a rotary member disposed on the side of said output shaft, and a rate of change of a rotating speed of a rotary member disposed on the side of said input shaft;

a manipulated amount calculating portion configured to set, as said manipulated amounts, a torque of the rotary member disposed on the side of said input shaft, a torque capacity of one of the coupling devices which is to be engaged for a shifting action of said automatic transmission, and a torque capacity of the other of the coupling devices which is to be released for the shifting action; and a torque assignment ratio calculating portion configured to set torque assignment ratios which are ratios of torques to be transferred through the respective coupling devices to be engaged and released for the shifting action, and when a second shifting action of the automatic transmission is required to be performed, during a preceding first shifting action according to a first shifting model, said manipulated amount calculating portion switching said first shifting model corresponding to said first shifting action to a second shifting model corresponding to said second shifting action, to implement a shifting control of the automatic transmission for performing said second shifting action according to said second shifting model.

2. The transmission shifting control apparatus according to claim 1, wherein said manipulated amount calculating portion does not switch said first shifting model to said second shifting model, where the second shifting action is required during said first shifting action while said torque assignment ratios are being changed.

3. The transmission shifting control apparatus according to claim 2, wherein when said second shifting action is required to be performed, during said first shifting action while said torque assignment ratios are being changed, said manipulated amount calculating portion switches said first shifting model to said second shifting model after changes of said torque assignment ratios are terminated.

4. The transmission shifting control apparatus according to claim 2, wherein said torque assignment ratios are returned back to original values prior to a moment of initiation of their changes for said first shifting action during which said second shifting action is required to be performed, said first shifting model corresponding to the first shifting action is switched to said second shifting model corresponding to the second shifting action after the torque assignment ratios have been returned to said original values.

5. The transmission shifting control apparatus according to claim 1, wherein said manipulated amount calculating portion is operated according to said shifting model which is formulated to calculate said manipulated amounts on the basis of said shifting target values, and according to motion equations of the automatic transmission including said shifting target values and said manipulated amounts, and a relationship representative of said torque assignment ratios.

* * * * *